(12) United States Patent
Li et al.

(10) Patent No.: US 9,018,030 B2
(45) Date of Patent: Apr. 28, 2015

(54) TRANSPARENT FORCE SENSOR AND METHOD OF FABRICATION

(75) Inventors: Hao Li, Chandler, AZ (US); Papu Maniar, Tempe, AZ (US); Yi Wei, Chandler, AZ (US)

(73) Assignee: Symbol Technologies, Inc., Holtsville, NY (US)

( * ) Notice: Subject to any disclaimer, the term of this patent is extended or adjusted under 35 U.S.C. 154(b) by 1322 days.

(21) Appl. No.: 12/725,699

(22) Filed: Mar. 17, 2010

(65) Prior Publication Data

US 2011/0227836 A1  Sep. 22, 2011

(51) Int. Cl.
*G06F 3/047* (2006.01)
*G06F 3/041* (2006.01)
*G01L 1/20* (2006.01)

(52) U.S. Cl.
CPC .............. *G06F 3/047* (2013.01); *G06F 3/0414* (2013.01); *G06F 2203/04103* (2013.01); *G01L 1/20* (2013.01); *G01L 1/205* (2013.01)

(58) Field of Classification Search
CPC .................. G06F 3/0414; G06F 3/047; G06F 2203/04103
USPC ........ 438/50, 51, 53; 257/415, 417, E29.324; 345/173, 174
See application file for complete search history.

(56) References Cited

U.S. PATENT DOCUMENTS

| | | |
|---|---|---|
| 4,252,391 A | 2/1981 | Sado |
| 4,315,238 A | 2/1982 | Eventoff |
| 4,570,149 A | 2/1986 | Thornburg et al. |
| 4,625,075 A | 11/1986 | Jaeger |
| 4,739,299 A | 4/1988 | Evenloff et al. |
| 4,745,240 A | 5/1988 | Furukawa et al. |
| 4,800,260 A | 1/1989 | Simpson-Davis et al. |
| 5,008,497 A | 4/1991 | Asher |
| 5,060,527 A | 10/1991 | Burgess |
| 5,241,308 A | 8/1993 | Young |
| 5,510,813 A | 4/1996 | Makinwa et al. |
| 5,647,017 A | 7/1997 | Smithies et al. |
| 5,673,041 A | 9/1997 | Chatigny et al. |
| 5,989,700 A | 11/1999 | Krivopal |
| 6,034,335 A | 3/2000 | Aufderheide et al. |
| 6,073,497 A | 6/2000 | Jiang et al. |
| 6,193,152 B1 | 2/2001 | Fernando et al. |
| 6,239,790 B1 | 5/2001 | Martinelli et al. |
| 6,291,568 B1 | 9/2001 | Lussey |
| 6,307,955 B1 | 10/2001 | Zank et al. |

(Continued)

FOREIGN PATENT DOCUMENTS

| | | |
|---|---|---|
| CA | 2316067 A1 | 2/2002 |
| CN | 101201277 A | 6/2008 |

(Continued)

OTHER PUBLICATIONS

U.S. Appl. No. 12/052,365, filed Mar. 20, 2008 entitled "Transparent Pressure Sensor and Method for Using".

(Continued)

*Primary Examiner* — Kimberly Rizkallah
*Assistant Examiner* — Maria Ligai

(57) ABSTRACT

A transparent force sensor for use in touch panel displays (touch screens) and method for fabricating the same are disclosed. The transparent force sensor is capable of detecting touch by measuring local pressure applied by a touch input to a display area of the touch screen.

9 Claims, 11 Drawing Sheets

(56) References Cited

U.S. PATENT DOCUMENTS

| | | | |
|---|---|---|---|
| 6,310,614 B1 | 10/2001 | Maeda et al. | |
| 6,473,072 B1 | 10/2002 | Comiskey et al. | |
| 6,492,979 B1 | 12/2002 | Kent et al. | |
| 6,543,299 B2 | 4/2003 | Taylor | |
| 6,558,577 B1 | 5/2003 | Niihara et al. | |
| 6,628,269 B2 | 9/2003 | Shimizu | |
| 6,781,576 B2 | 8/2004 | Tamura | |
| 6,873,715 B2 | 3/2005 | Kuo et al. | |
| 7,081,888 B2 | 7/2006 | Cok et al. | |
| 7,084,859 B1 | 8/2006 | Pryor | |
| 7,093,197 B2 | 8/2006 | Yoshii et al. | |
| 7,146,577 B2 | 12/2006 | Hoffman | |
| 7,152,482 B2 | 12/2006 | Ueno et al. | |
| 7,154,481 B2 | 12/2006 | Cross et al. | |
| 7,196,694 B2 | 3/2007 | Roberts | |
| 7,331,245 B2 | 2/2008 | Nishimura et al. | |
| 7,339,580 B2 | 3/2008 | Westerman et al. | |
| 7,355,594 B2 | 4/2008 | Barkan | |
| 7,355,595 B2 | 4/2008 | Bathiche et al. | |
| 7,415,141 B2 | 8/2008 | Okazaki | |
| 7,499,040 B2 | 3/2009 | Zadesky et al. | |
| 7,509,881 B2 | 3/2009 | Divigalpitiya et al. | |
| 7,511,702 B2 | 3/2009 | Hotelling | |
| 7,538,760 B2 | 5/2009 | Hoteling | |
| 7,627,143 B1 | 12/2009 | Abebe | |
| 7,695,647 B2 | 4/2010 | Smela et al. | |
| 7,792,336 B2 | 9/2010 | Crockett et al. | |
| 8,149,211 B2 | 4/2012 | Hayakawa et al. | |
| 8,325,143 B2 | 12/2012 | Destura et al. | |
| 8,390,583 B2 | 3/2013 | Forutanpour et al. | |
| 8,508,487 B2 | 8/2013 | Schwesig et al. | |
| 2002/0180763 A1 | 12/2002 | Kung | |
| 2003/0132294 A1 | 7/2003 | Gomez et al. | |
| 2003/0205450 A1 | 11/2003 | Divigalpitiya et al. | |
| 2004/0028993 A1* | 2/2004 | Jousse et al. | 429/44 |
| 2004/0212599 A1 | 10/2004 | Cok et al. | |
| 2005/0081640 A1* | 4/2005 | Knowles et al. | 73/818 |
| 2005/0084138 A1 | 4/2005 | Inkster et al. | |
| 2005/0287048 A1 | 12/2005 | Parkinson | |
| 2006/0066584 A1 | 3/2006 | Barkan | |
| 2006/0137462 A1* | 6/2006 | Divigalpitiya et al. | 73/760 |
| 2006/0146036 A1 | 7/2006 | Prados et al. | |
| 2006/0262099 A1 | 11/2006 | Destura et al. | |
| 2006/0279548 A1 | 12/2006 | Geaghan | |
| 2007/0045593 A1* | 3/2007 | Yasuda et al. | 252/500 |
| 2007/0175987 A1 | 8/2007 | Havens et al. | |
| 2007/0198926 A1 | 8/2007 | Joguet et al. | |
| 2007/0202765 A1 | 8/2007 | Krans et al. | |
| 2007/0222764 A1 | 9/2007 | Wang | |
| 2007/0229464 A1 | 10/2007 | Hotelling et al. | |
| 2007/0236466 A1 | 10/2007 | Hotelling | |
| 2007/0268275 A1 | 11/2007 | Westerman et al. | |
| 2008/0024454 A1 | 1/2008 | Everest | |
| 2008/0029691 A1 | 2/2008 | Han | |
| 2008/0048989 A1 | 2/2008 | Yoon et al. | |
| 2008/0058022 A1 | 3/2008 | Ahn | |
| 2008/0091121 A1 | 4/2008 | Sun et al. | |
| 2008/0093687 A1* | 4/2008 | Antaki | 257/415 |
| 2008/0165141 A1 | 7/2008 | Christie | |
| 2008/0180399 A1 | 7/2008 | Cheng | |
| 2008/0204426 A1 | 8/2008 | Hotelling et al. | |
| 2008/0211784 A1 | 9/2008 | Hotelling et al. | |
| 2008/0211785 A1 | 9/2008 | Hotelling et al. | |
| 2008/0231604 A1 | 9/2008 | Peterson | |
| 2008/0292887 A1 | 11/2008 | Kim et al. | |
| 2008/0303797 A1 | 12/2008 | Grothe | |
| 2008/0309639 A1 | 12/2008 | Wei et al. | |
| 2009/0027353 A1 | 1/2009 | Im et al. | |
| 2009/0120696 A1 | 5/2009 | Hayakawa et al. | |
| 2009/0189877 A1 | 7/2009 | Washino et al. | |
| 2009/0237374 A1 | 9/2009 | Li | |
| 2009/0278815 A1 | 11/2009 | Li et al. | |
| 2009/0295748 A1 | 12/2009 | Liu et al. | |
| 2010/0037709 A1 | 2/2010 | Yeh et al. | |
| 2010/0045610 A1 | 2/2010 | Hong et al. | |
| 2010/0060602 A1 | 3/2010 | Agari et al. | |
| 2010/0066686 A1 | 3/2010 | Joguet et al. | |
| 2010/0117974 A1 | 5/2010 | Joguet et al. | |
| 2010/0141085 A1* | 6/2010 | Wu et al. | 310/311 |
| 2010/0225443 A1 | 9/2010 | Bayram et al. | |
| 2010/0289507 A1 | 11/2010 | Joguet et al. | |
| 2010/0289508 A1 | 11/2010 | Joguet et al. | |
| 2010/0302196 A1 | 12/2010 | Han et al. | |
| 2010/0302197 A1 | 12/2010 | Joguet et al. | |
| 2011/0001487 A1 | 1/2011 | Joguet et al. | |
| 2011/0025615 A1 | 2/2011 | Yang et al. | |
| 2011/0025619 A1 | 2/2011 | Joguet et al. | |
| 2011/0050394 A1 | 3/2011 | Zhang et al. | |
| 2011/0050588 A1 | 3/2011 | Li et al. | |
| 2011/0115736 A1 | 5/2011 | Joguet et al. | |
| 2011/0119580 A1 | 5/2011 | Joguet et al. | |
| 2011/0134067 A1 | 6/2011 | Joguet et al. | |
| 2011/0141026 A1 | 6/2011 | Joquet et al. | |
| 2011/0168957 A1* | 7/2011 | Lonjon et al. | 252/513 |
| 2011/0169760 A1 | 7/2011 | Largillier | |
| 2011/0181546 A1 | 7/2011 | Joguet et al. | |
| 2011/0181547 A1 | 7/2011 | Joguet et al. | |
| 2011/0237326 A1 | 9/2011 | Murakami | |
| 2011/0273394 A1 | 11/2011 | Young et al. | |
| 2012/0026124 A1 | 2/2012 | Li et al. | |
| 2013/0063364 A1 | 3/2013 | Moore | |
| 2013/0141338 A1 | 6/2013 | Wei et al. | |
| 2014/0035830 A1 | 2/2014 | Wei et al. | |

FOREIGN PATENT DOCUMENTS

| | | | |
|---|---|---|---|
| EP | 1471415 | A2 | 10/2004 |
| EP | 2000896 | A2 | 12/2008 |
| FR | 2914756 | A1 | 10/2008 |
| FR | 2925717 | A1 | 6/2009 |
| JP | 5143219 | A | 6/1993 |
| JP | H06274265 | A | 9/1994 |
| JP | 2002297305 | A | 10/2002 |
| JP | 2005517935 | A | 6/2005 |
| JP | 2005528740 | A | 9/2005 |
| JP | 2005350614 | A | 12/2005 |
| JP | 2008305174 | A | 12/2008 |
| JP | 2011003104 | A | 1/2011 |
| KR | 10-1408620 | | 6/2014 |
| KR | 10-1439718 | | 9/2014 |
| WO | 9850876 | A1 | 11/1998 |
| WO | WO0241129 | A2 | 5/2002 |
| WO | WO03021568 | A1 | 3/2003 |
| WO | WO03094186 | A1 | 11/2003 |
| WO | 2004066136 | A2 | 8/2004 |
| WO | 2006013485 | A2 | 2/2006 |
| WO | 2006017695 | A2 | 2/2006 |
| WO | 2007012899 | A1 | 2/2007 |
| WO | 2009035184 | A1 | 3/2009 |
| WO | 2009104840 | A2 | 8/2009 |
| WO | 2010117882 | A2 | 10/2010 |
| WO | 2010141737 | A2 | 12/2010 |

OTHER PUBLICATIONS

U.S. Appl. No. 12/548,983, filed Aug. 27, 2009 entitled "Systems and Methods for Pressure Based Authentication of a Signature on a Touch Screen".

U.S. Appl. No. 12/549,008, filed Aug. 27, 2009 entitled "Method and Apparatus for Pressurebased Manipulation of Content on a Touch Screen".

Koehly, R., et al., Paper FSRs and Latex/Fabric Traction Sensors: Methods for the Development of Home-Made Touch Sensors, Proceedings of the 2006 International Conference on New Interfaces for Musical Expression (NIME06, Paris, France).

Final Office Action mailed on Apr. 11, 2013 in related U.S. Appl. No. 12/776,627, Steven Young, filed May 10, 2010.

Final Office Action mailed on Aug. 23, 2012 in related U.S. Appl. No. 12/052,365, Hao Li, filed Mar. 20, 2008.

Final Office Action mailed on Jan. 17, 2013 in related U.S. Appl. No. 12/548,983, Keshu Zhang, filed Aug. 27, 2009.

Final Office Action mailed on Jul. 14, 2011 in related U.S. Appl. No. 12/052,365, Hao Li, filed Mar. 20, 2008.

(56) References Cited

OTHER PUBLICATIONS

International Preliminary Report on Patentability and Written Opinion for counterpart International Application PCT/US2010/060967 mailed on Sep. 27, 2012.
International Preliminary Report on Patentability and Written Opinion for related International Application No. PCT/US2010/046718 mailed on Mar. 8, 2012.
International Preliminary Report on Patentability and Written Opinion for related International Application PCT/US2011/044214 mailed on Feb. 14, 2013.
International Preliminary Report on Patentability and Written Opinion for related International Patent Application No. PCT/US2010/046717 issued on Mar. 8, 2012.
International Preliminary Report on Patentability and Written Opinion for related International Application No. PCT/US2011/032596 mailed on Nov. 22, 2012.
International Search Report and Written Opinion for counterpart International Application No. PCT/US2010/060967 mailed on Jun. 15, 2012.
International Search Report and Written Opinion for related International Application No. PCT/US2011/044214 mailed on Dec. 1, 2011.
International Search Report for related International Application No. PCT/US2012/067079 mailed on Mar. 12, 2013.
International Search Report and Written Opinion for related International Application No. PCT/US2010/046717 mailed on Nov. 30, 2010.
International Search Report and Written Opinion for related International Application No. PCT/US2010/046718 mailed on Dec. 8, 2010.
International Search Report and Written Opinion for related International Application No. PCT/US2011/032596 mailed on Sep. 30, 2011.
Non Final Office Action mailed Apr. 8, 2013 in related U.S. Appl. No. 13/309,929, Yi Wei, filed Dec. 2, 2011.
Non Final Office Action mailed on Apr. 6, 2012 in related U.S. Appl. No. 12/052,365, Hao Li, filed Mar. 20, 2008.
Non Final Office Action mailed on Aug. 3, 2012 in related U.S. Appl. No. 12/548,983, Keshu Zhang, filed Aug. 27, 2009.
Non Final Office Action mailed on Feb. 24, 2011 in related U.S. Appl. No. 12/052,365, Hao Li, filed Mar. 20, 2008.
Non Final Office Action mailed on Mar. 26, 2012 in related U.S. Appl. No. 12/548,983, Keshu Zhang, filed Aug. 27, 2009.
Non Final Office Action mailed on May 20, 2013 in related U.S. Appl. No. 12/848,127, Hao Li, filed Jul. 31, 2010.
Non Final Office Action mailed on May 24, 2012 in related U.S. Appl. No. 12/549,008, Hao Li, filed Aug. 27, 2009.
Non Final Office Action mailed on Sep. 28, 2012 in related U.S. Appl. No. 12/776,627, Steven Young, filed May 10, 2010.
Notice of Allowance mailed on Nov. 29, 2012 in related U.S. Appl. No. 12/549,008, Hao Li, filed Aug. 27, 2009.
Notice of Allowance mailed on Sep. 7, 2012 in related U.S. Appl. No. 12/549,008, Hao Li, filed Aug. 27, 2009.
English translation of Korean Office Action for related Application No. 10-2012-7004899 issued on Feb. 20, 2013.
Non Final Office Action mailed on Jul. 9, 2013 in related U.S. Appl. No. 12/052,365, Hao Li, filed Mar. 20, 2008.
Final Office Action mailed on Aug. 16, 2013 in related U.S. Appl. No. 13/309,929, Yi Wei, filed Dec. 2, 2011.
Final Office Action mailed Oct. 29, 2013 in related U.S. Appl. No. 12/052,365, Hao Li, filed Mar. 20, 2008.
Notice of Allowance mailed Oct. 8, 2013 in related U.S. Appl. No. 12/548,983, Keshu Zhang, filed Aug. 27, 2009.
Non-Final Office Action mailed Nov. 7, 2013 in related U.S. Appl. No. 12/848,127, Hao Li, filed Jul. 31, 2010.
English translation of Japanese Office Action for counterpart Application No. 2012-526954 issued on Jul. 26, 2013.
Non-Final Office Action maild on Jan. 2, 2014 in related U.S. Appl. No. 12/776,627, Steven Young, filed May 20, 2010.
Non-Final Office Action mailed on Dec. 23, 2013 in related U.S. Appl. No. 13/309,929, Yi Wei, filed Dec. 2, 2011.
Notice of Allowance mailed Jan. 17, 2014 in related U.S. Appl. No. 12/548,983, Keshu Zhang, filed Aug. 27, 2009.
Notice of Allowance mailed Mar. 4, 2014 in related U.S. Appl. No. 12/548,983, Keshu Zhang, filed Aug. 27, 2009.
English translation of Korean Office Action for counterpart Application No. 10-2012-7004856 issued on Jul. 21, 2013.
European Rejection Report mailed on Sep. 9, 2013 in counterpart European Patent Application No. 107604779.
English translation of Japanese First Office Action for counterpart Application No. 2012-526953 mailed on Aug. 1, 2013.
International Search Report and Written Opinion for related International Application No. PCT/US2013/049967 mailed on Sep. 19, 2013.
Non-Final Office Action mailed Apr. 18, 2014 in related U.S. Appl. No. 13/563,040, Yi Wei, filed Jul. 31, 2012.
Supplemental Notice of Allowance mailed Mar. 31, 2014 in related U.S. Appl. No. 12/548,983, Keshu Zhang, filed Aug. 27, 2009.
Final Office Action mailed Mar. 13, 2014 in related U.S. Appl. No. 12/848,127, Hao Li, filed Jul. 31, 2010.
Notice of Allowance mailed Oct. 24, 2014 in related U.S. Appl. No. 12/848,127.
Notice of Allowance mailed Jul. 31, 2014 in related U.S. Appl. No. 12/548,983.
Final Office Action mailed Aug. 20, 2014 in related U.S. Appl. No. 12/563,040.
Second Office Action mailed Aug. 27, 2014 in related China Patent Application No. 201080039352.8.
Office Action dated Mar. 12, 2014 in related Japan Patent Application 2012-526954.
Second Final Rejection of May 19, 2014 in related Korea Patent Application No. 10-2012-7004899.
Second Office Action dated Aug. 4, 2014 in related China Patent Application No. 2010-8003858.8.
Notice of Allowance dated Aug. 28, 2014 in related Japan Patent Application 2012-526953 (now Japan Patent 5616967.
Final Office Action mailed Jul. 28, 2014 in related U.S. Appl. No. 13/309,929.
Final Office Action mailed May 8, 2014 in related U.S. Appl. No. 12/776,627.
English translation of Decision of Rejection dated Sep. 3, 2014 in related Japan Application 2013-5090804.

\* cited by examiner

TRANSPARENT FORCE SENSOR AND METHOD OF FABRICATION

CROSS REFERENCE TO RELATED APPLICATION(S)

The present non-provisional application is related to co-pending U.S. application Ser. No. 12/052,365 filed Mar. 20, 2008 and entitled 'Transparent Pressure Sensor and Method for Using,' the contents of which are incorporated herein in their entirety.

TECHNICAL FIELD

This disclosure relates to a computing device input arrangement, and more particularly to a transparent force sensor and method of fabrication for use in touch panel displays.

BACKGROUND

Today, in many electronic devices, such as portable communication devices, touch panel displays (touch screens) present information to a user and also receive input from the user. A touch screen is especially useful in portable communication devices where other input devices, such as a keyboard and a mouse, are not easily available.

There are many different types of touch sensing technologies in use today, including capacitive, resistive, infrared, and surface acoustic wave. These technologies sense the position of touches on a screen. However, they do not respond to the pressure that is applied against the touch screen.

For example, it has been proposed in U.S. Pat. No. 6,492,979 to Kent et al. to use a combination of capacitive touch screen and force sensors to prevent false touch. This approach, however, can complicate the sensor interfaces and does not lend itself to sensing different touch forces at the same time. U.S. Pat. No. 7,196,694 to Roberts proposes using force sensors at the peripherals of the touch screen to determine the position of a touch. This however does not offer a capability of multi-touch. It has also been proposed in US Patent Publication No. 2007/0229464 to use a capacitive force sensor array, overlaying a display to form a touch screen. Although this approach offers multi-touch capability, a capacitive pressure sensor has limited spatial resolution and is subject to environmental interferences such as electromagnetic interference (EMI) and capacitive coupling of fingers and other input devices.

Accordingly, there is a need for improved touch sensing technologies and devices.

SUMMARY

A transparent force sensor for use in touch panel displays (touch screens) and method for fabricating the same are disclosed. The transparent force sensor is capable of detecting touch by measuring local pressure applied by a touch input to a display area of the touch screen.

Various aspects of the touch screen relate to force sensing. For example, according to one aspect, a force sensing touch screen includes a first plurality of transparent conducting oxide (TCO) electrodes (traces) disposed on a first surface of a transparent polymer matrix and arranged in a first direction, a plurality of transparent conducting nanoparticles dispersed in the transparent polymer matrix, and a second plurality of TCO electrodes disposed on a second surface of the transparent polymer matrix opposing the first surface and arranged in a second direction overlaying the first direction. Upon a force being applied at a cross section of one of the first and second plurality of TCO electrodes, the transparent conducting nanoparticles at the cross section provide a conducting path through the transparent polymer matrix.

In one embodiment, for example, the polymer matrix is disposed on a transparent substrate. The transparent conducting nanoparticles can include indium tin oxide (ITO), zinc oxide (ZnO), tin dioxide (SnO2), or combinations thereof. In one embodiment, a drive voltage is applied to the first plurality of TCO electrodes using a drive multiplexor and a measurement resistor is connected to each of the second plurality of TCO electrodes using a sense multiplexor. In yet another embodiment, the force sensing touch screen includes a plurality of operational amplifiers that are adapted to minimize cross talk among the plurality of TCO electrodes.

In another aspect, a method of fabricating a force sensing touch screen having a transparent force sensor includes forming a transparent polymer matrix including a plurality of transparent conducting nanoparticles, disposing on a first surface of the transparent polymer matrix a first plurality of transparent conducting oxide (TCO) electrodes, the first plurality of TCO electrodes arranged in a first direction, and disposing on a second surface of the transparent polymer matrix opposing the first surface a second plurality of TCO electrodes, the second plurality of TCO electrodes arranged in a second direction overlaying the first direction. Upon a force being applied at a cross section of at least one of the first and second plurality of TCO electrodes, the transparent conducting nanoparticles at the cross section provide a conducting path from the at least one of the first plurality of TCO electrodes to the at least one of the second plurality of electrodes.

In one embodiment, forming the transparent polymer matrix includes dispersing the plurality of transparent conducting nanoparticles in a first solvent system, dispersing a transparent polymer in a second solvent system, and combining the first and second solvent systems in a predetermined ratio determined by a percolation value for the combination. The method can also include degassing the combination, disposing the degassed combination on a substrate to form a dry film, and curing the dry film.

Several benefits can be derived from the present invention. For example, the force sensor can simplify the input process by enabling different combinations of positions and forces on a touch screen. An additional advantage is that the force sensor is not limited to only detecting finger touch and can accept input from many other devices including, but not limited to, a stylus and glove. The force sensor is also more tolerant to environmental noises, such as Electromagnetic Interference (EMI).

Additional features and advantages will be readily apparent from the following detailed description, the accompanying drawings and claims.

BRIEF DESCRIPTION OF DRAWINGS

Like reference symbols in the various drawings indicate like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
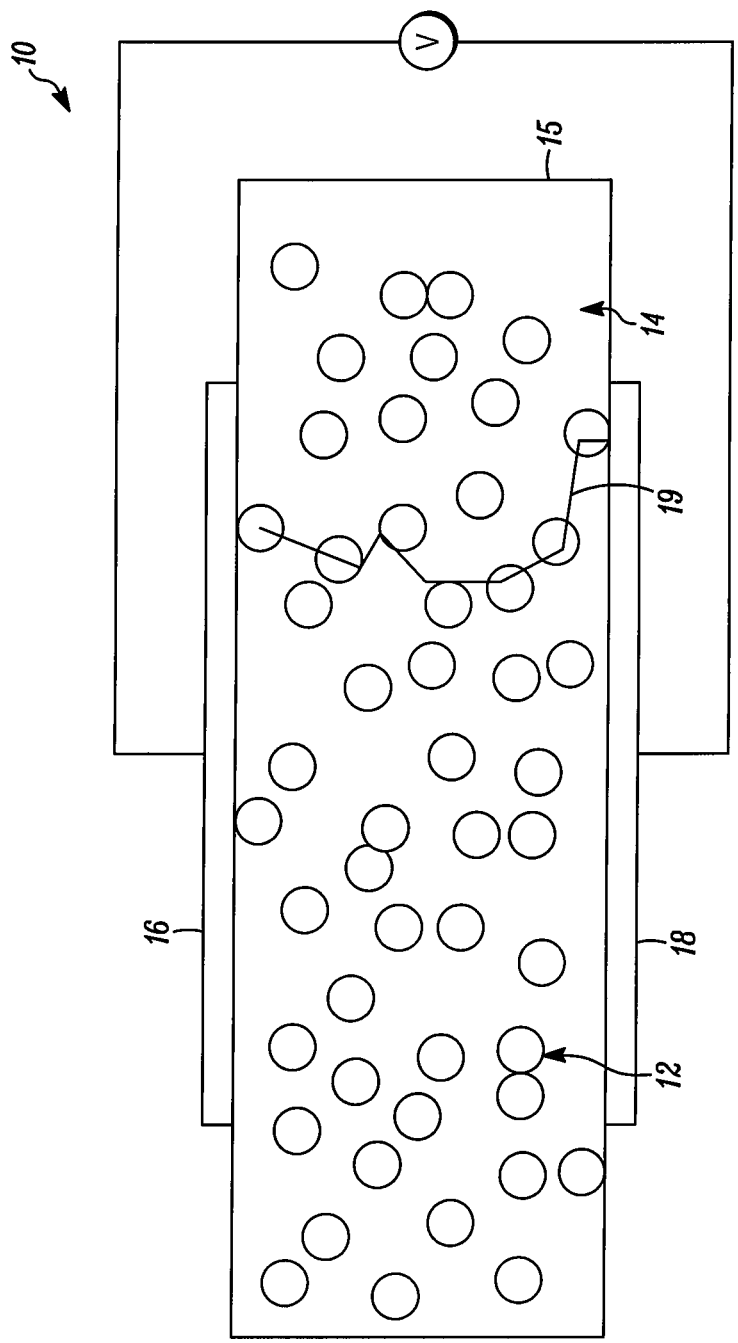
FIG. 1 is a schematic of a touch screen sensor according to an embodiment of the present invention.

Referring to FIG. 1, a transparent touch screen sensor 10 is disclosed. The sensor 10 can be implemented in various electronic devices having displays including, but not limited to, mobile computers, computer monitors, mobile phones, personal digital assistants (PDAs), and service terminals. The sensor 10 is configured to detect touch by measuring local pressure exerted on a display area, such as a touch screen. Advantageously, the sensor 10 allows a third dimension of input, namely force, to be analyzed in addition to time and location inputs, thereby enabling a whole new range of applications.

In one embodiment, the sensor 10 comprises a force sensing transparent polymer-conductor composite (TPCC) 15, which consists of transparent conducting oxide (TCO) nanoparticles 12 dispersed in a transparent polymer matrix 14. The TPCC 15 can comprise, for example, phenoxy resin, polyester, silicone rubber, polimide, or combinations thereof. In one embodiment, for example, the TCO nanoparticles 12 are sized less than 100 nm.

As shown in FIG. 1, one or more TCO electrodes (traces) 16, 18 are disposed on each opposite side of the TPCC 15. Upon a pressure being applied to at least one of the TCO electrodes 16, 18 on one side of the TPCC 15, the resistance across the TCO electrodes 16, 18 is decreased and is measured by the electrodes 16, 18. The resistance of the TPCC 15 is highly sensitive to pressure near the composition of percolation threshold.

The transparent conducting nanoparticles 12 of the transparent polymer matrix 14 provide a conducting path 19 through the TPCC 15. For example, as shown in FIG. 1, current can flow through the TPCC 15 via the nanoparticles 12, either directly when the nanoparticles 12 are in contact with each other, or by tunneling when the particles are separated by a very small distance. When pressure is applied to the TPCC 15, the TPCC 15 deforms and increases the number of conductive paths, thereby lowering the resistance.

Figure 2:
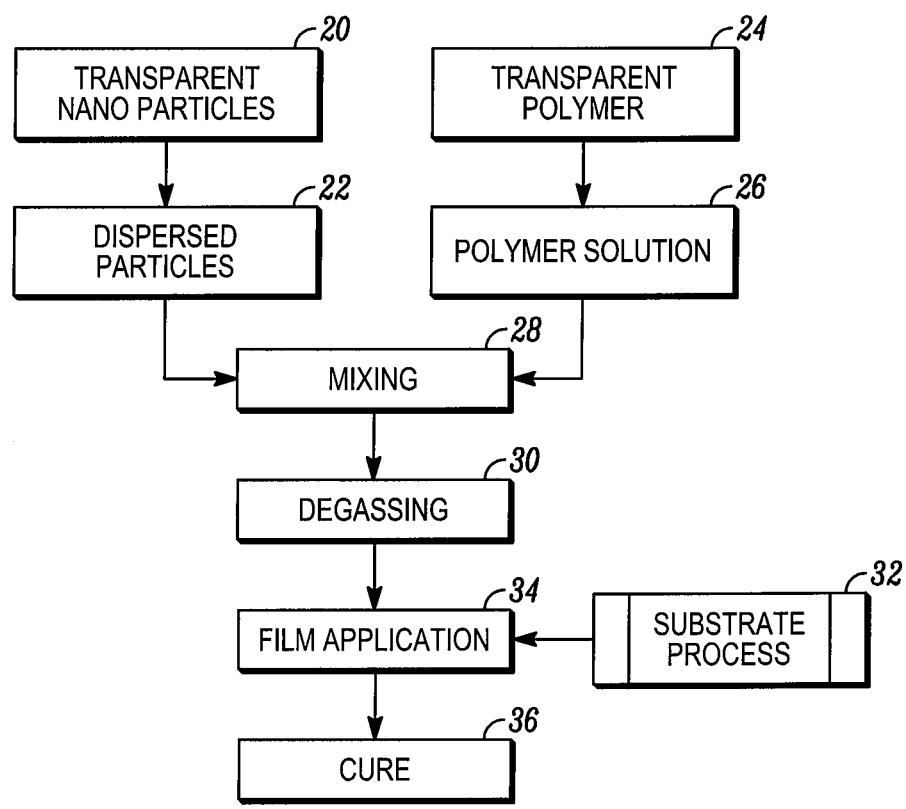
FIG. 2 is a flow chart of a method for fabricating the touch screen sensor shown in FIG. 1.

FIG. 2 illustrates an exemplary method of fabricating the sensor 10 shown in FIG. 1. As shown in FIG. 2, in one embodiment, for example, preparation of the TPCC 15 begins with obtaining transparent conducting nanoparticles 20. In one embodiment, for example, the nanoparticles are indium tin oxide (ITO) alloys. In another embodiment, for example, the nanoparticles are zinc oxide (ZnO) alloys. In yet another embodiment, the nanoparticles are tin dioxide (SnO2) alloys. Next, the obtained nanoparticles are dispersed in a first solvent system 22. The first solvent system can include methyl ethyl ketone (MEK), Toluene, Methonal, 1-Phenoxy-2-Propanol (DPPH), or any other suitable solvent having similar solvent qualities.

Preparation of the sensor 10 also includes obtaining a transparent polymer 24. Example transparent polymers that can be used with the present invention include, but are not limited to, phenoxy resin, polyethers, acrylic, silicone, lacquer, or other types of transparent elastomers, or combinations thereof. The obtained transparent polymer is then dissolved in a second solvent system 26 having qualities similar to the first solvent system. The two solvent systems 22, 26 are then measured in predetermined ratios and combined to form a matrix 28. In one embodiment, for example, the measurements are determined by a percolation point associated with combining the two solvent systems 22, 26. In one embodiment, for example, the combination matrix includes approximately twenty percent (20%) to thirty percent (30%) volume ratio of nanoparticles to matrix. Combining the two solvent systems 28 can be done utilizing a conventional high speed mixer, shaker, or the like.

Next, the combination matrix is degassed 30. In one embodiment, the degassing is performed in a vacuum chamber. In another embodiment, degassing of the matrix is done under ambient air pressure. The degassing step allows for any gas that may have been introduced into the combination matrix to be removed.

Substrates with transparent conducting traces having a predetermined pitch are then processed using standard photolithography, etching, and/or screen printing process 32. Once the substrates are processed, the mixture of the polymer composite is then disposed onto the substrates 34. In one embodiment, for example, a spin coating technique is used to apply the mixture to the substrate. Dip coating, screen printing, or any of the suitable thick film deposition techniques may be used to apply the polymer composite onto the substrate. Typically, the dry film thickness achieved from deposition ranges between 1 and 10 um. For example, in one embodiment, for example, the dry film thickness ranges between 6 and 8 um.

Once the film is deposited on the substrate, in one embodiment, for example, the substrate is cured in an oven 36. Various types of ovens can be used for curing the film, including a vacuum oven, convection oven and hot plate. Several heating stages can be applied to achieve a uniformly cured film. The final curing temperature can range between 120 and 200 degrees Celsius, inclusive. For example, in one embodiment, the final curing temperature of the transparent polymer matrix is approximately one-hundred and seventy (170) degrees Celsius.

Figure 3:
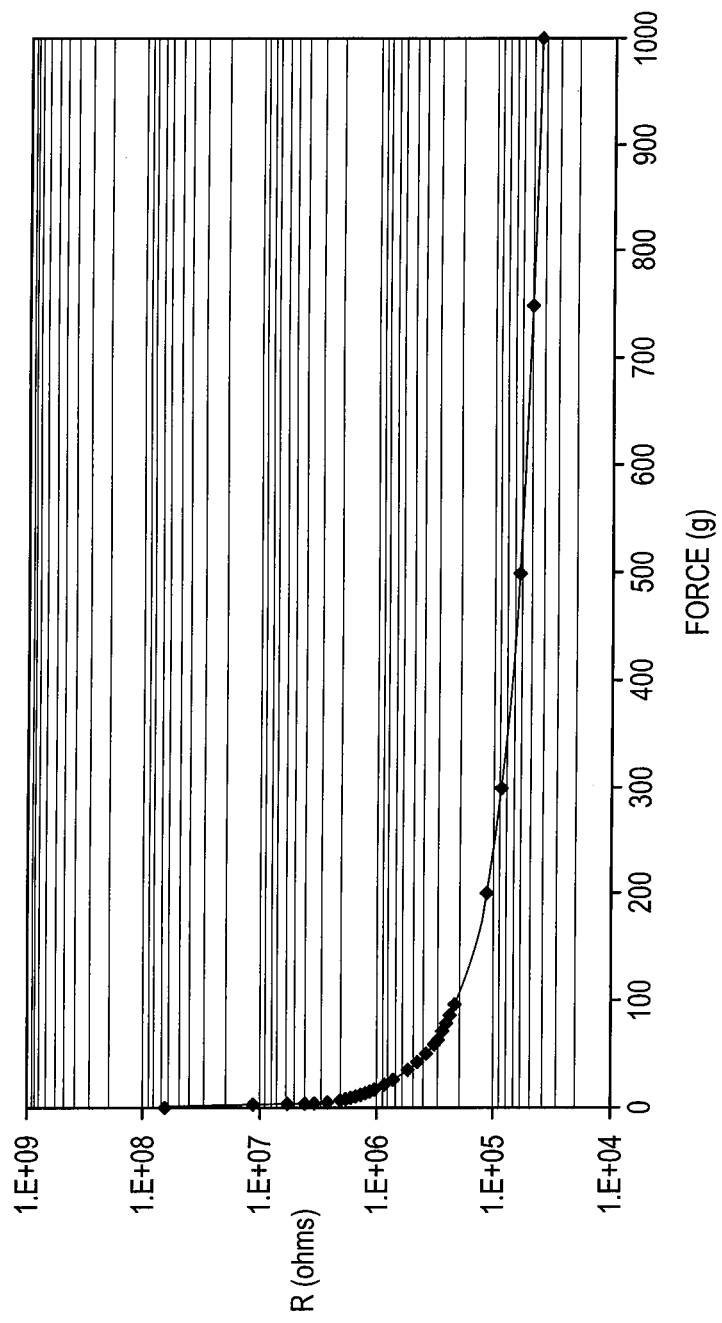
FIG. 3 is an example of a force-resistance curve generated using the touch screen sensor of FIG. 1.

The electrical response of combining the above materials in the matrix can be characterized by the force resistance curve and the transmission characteristics of the material. A typical resistance range can extend from over twenty (20) megohm at zero (0) pressure to approximately five (5) kilohm at less than one (1) kilogram of pressure. FIG. 3 illustrates an exemplary logarithmic resistance versus force curve measured on matrices produced by the above-described method.

Figure 4:
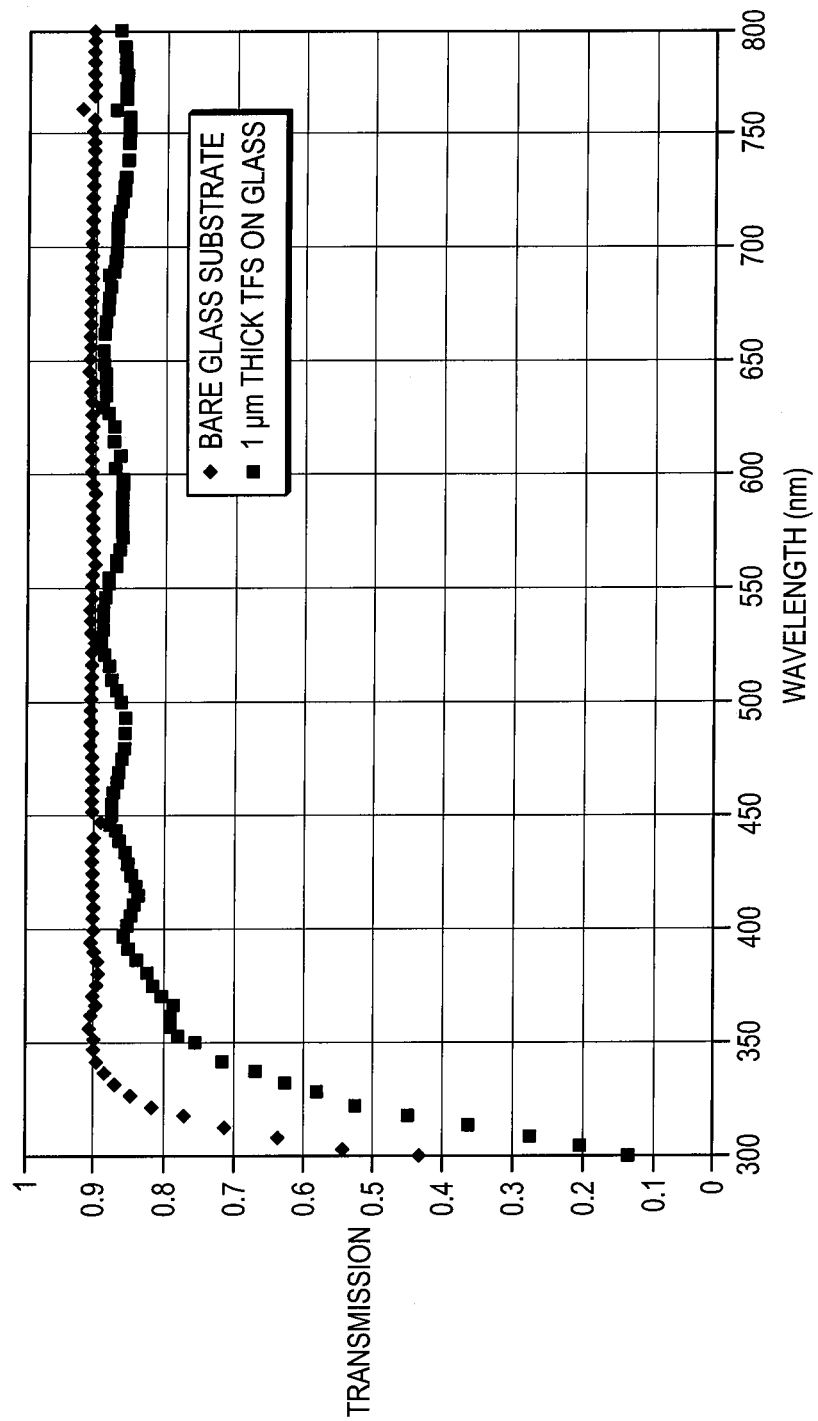
FIG. 4 is an example of a transmission spectrum generated using the touch screen sensor of FIG. 1.

Furthermore, using the TPCC described herein, over ninety percent (90%) of transmissions can be achieved with a film thickness of approximately 1 um. For example, in one embodiment, referring to FIG. 4, a transmission spectrum from three hundred nanometer (300 nm) to eight hundred nanometer (800 nm) for a one 1 um film thickness on a glass substrate can be achieved.

Figure 5:
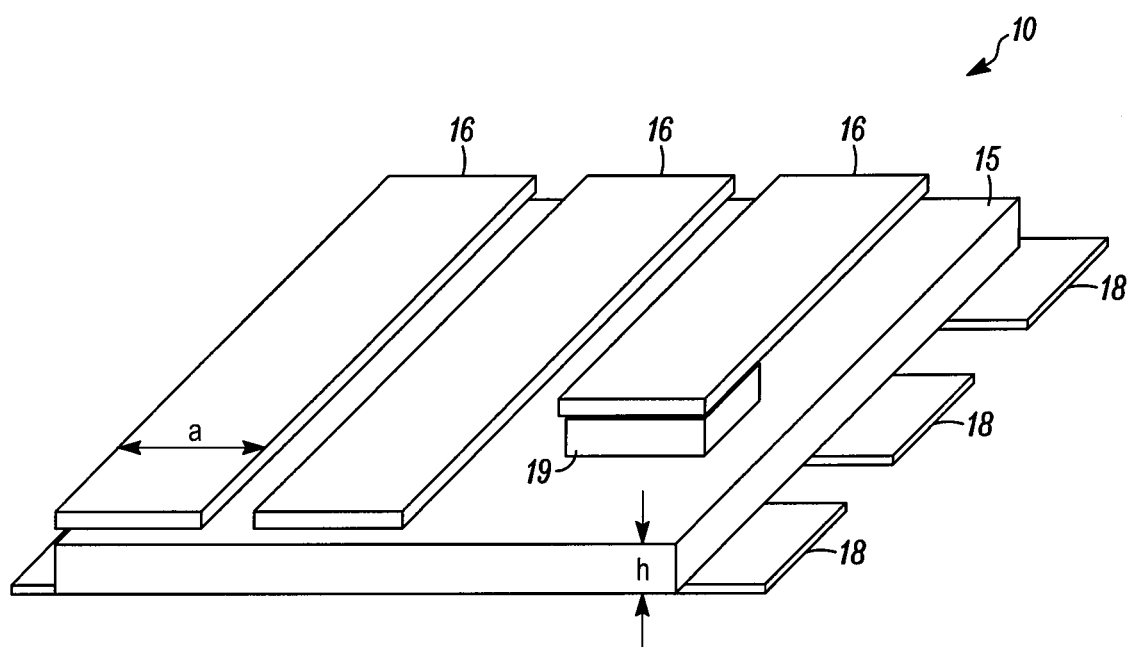
FIG. 5 is a partial cross section of exemplary components included in the touch screen sensor of FIG. 1.

Referring to FIG. 5, to form the structure of the sensor 10, in one embodiment, two perpendicular sets (row and column) of transparent conducting oxide (TCO) electrodes 16, 18 are disposed on both sides of the TPCC 15. A conducting path 19 is formed at each row and column intersection to form an array of addressable pixels. A force applied at each pixel location can be measured by probing the resistances at each row column intersection. A force sensing touch screen then can be formed by depositing the sensor 10 on a suitable transparent substrate, such as glass or plastic sheet. Scan and read signals are sent and received through the tab connectors attached to each set of TCO electrodes. An exploded view of such a structure is described and shown in connection with FIG. 6.

Figure 6:
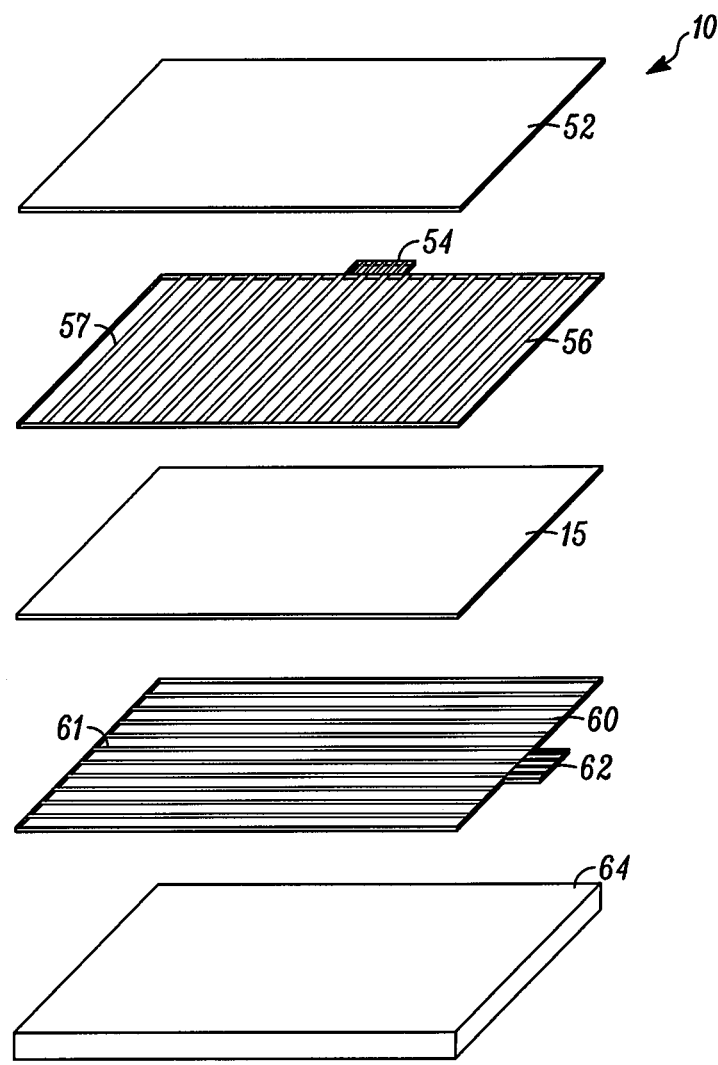
FIG. 6 is a perspective view of an exemplary embodiment including the touch screen sensor of FIG. 5.

Turning now to FIG. 6, in one embodiment, for example, the transparent pressure sensor 10 includes a transparent substrate 64 that can be a rigid material, for example, glass or a polymer, but may be a flexible material. A patterned layer 60 of transparent conductive electrodes 61 is deposited on the substrate 64 using any of the deposition techniques referenced earlier. In one embodiment, for example, the electrodes 61 are aligned in a first direction and are formed to have a pitch of 0.05-10 mm, (preferably 1.0 mm), a width less than the pitch but larger than 0.001 mm, and a thickness of 1.0-1000 nm, (preferably 40 nm). The transparent electrodes 61 may be a transparent conductive oxide, for example, indium tin oxide, zinc oxide, and tin oxide, as described previously. A tab 62 is electrically coupled to the electrodes 61 for providing connection to other circuitry.

The TPCC 15 is disposed on the electrodes 61 as a layer or in a predetermined pattern. As described previously, the TPCC 15 can be a transparent elastomeric matrix such as polyester, phenoxy resin, or silicone rubber. Transparent conductive or semiconductive particles such as indium tin oxide, zinc oxide, tin oxide, or combinations thereof are dispersed within the composite matrix as discussed above.

As shown in FIG. 6, a patterned layer 56 of transparent conductive electrodes 57 is disposed over the TPCC 15. The placement of the transparent conductive electrodes 57 creates a plurality of intersections, each including one of the transparent conductive electrodes 61. A tab 54 is electrically coupled to electrodes 57 for providing a connection to other circuitry. A substrate layer 52 of a transparent protective material, such as glass or a polymer, is disposed over the patterned layer 56.

Figure 7A:
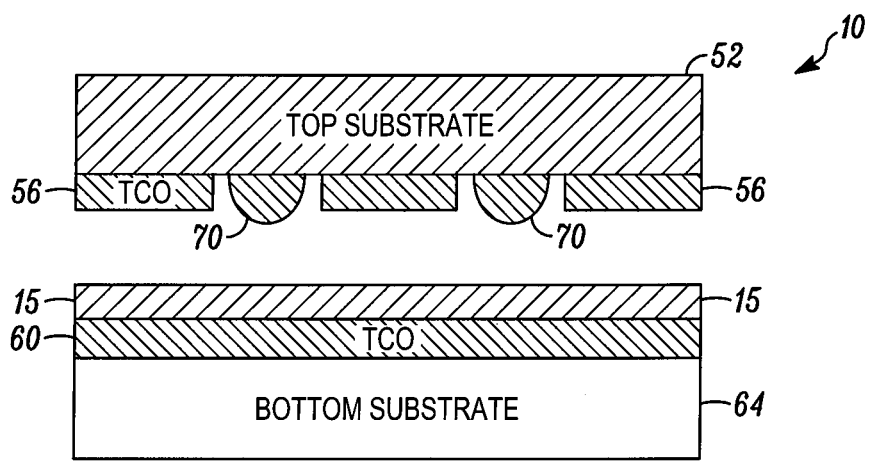
FIGS. 7A-C illustrate exemplary device configurations for the touch screen sensor shown in FIG. 5.
Figure 7B:
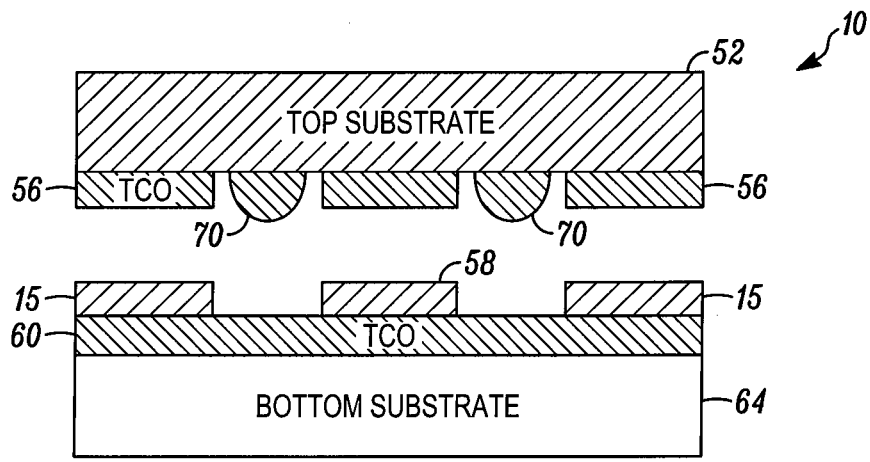
Figure 7C:
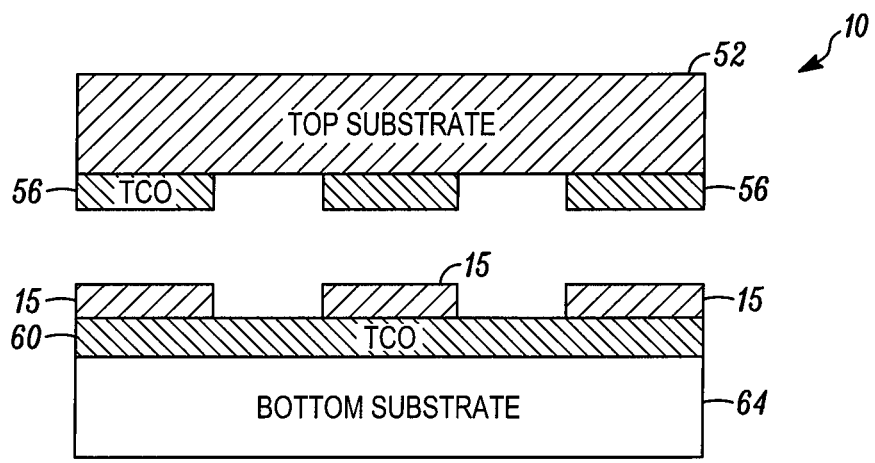

Turning now to FIGS. 7A-C, several different device configurations for the sensor 10 are shown. In one exemplary embodiment, as shown in FIG. 7A, bottom TCO electrodes 60 are deposited on a transparent substrate (bottom substrate) 64. The TPCC 15 is deposited in a blanket pattern over a top surface of bottom TCO electrodes 60. Spacers 70 are deposited in between electrodes of top TCO electrodes 56 to separate the top TCO electrodes 56 from the TPCC 15. Spacers 70 can be formed from polymers or polymer-like materials, as is known in the art.

In another exemplary embodiment, as shown in FIG. 7B, the TPCC 15 is patterned to form a plurality of separate islands, with each island formed at an intersect of top TCO electrodes 56. Spacers 70 are deposited in between electrodes of the top TCO electrodes 56 to separate the top TCO electrodes 56 from the bottom TCO electrodes 60 and TPCC 15. In yet another exemplary embodiment, as shown in FIG. 7C, the spacers are eliminated and the TPCC 15 is patterned to form separate islands that also operate as spacers.

Figure 8:
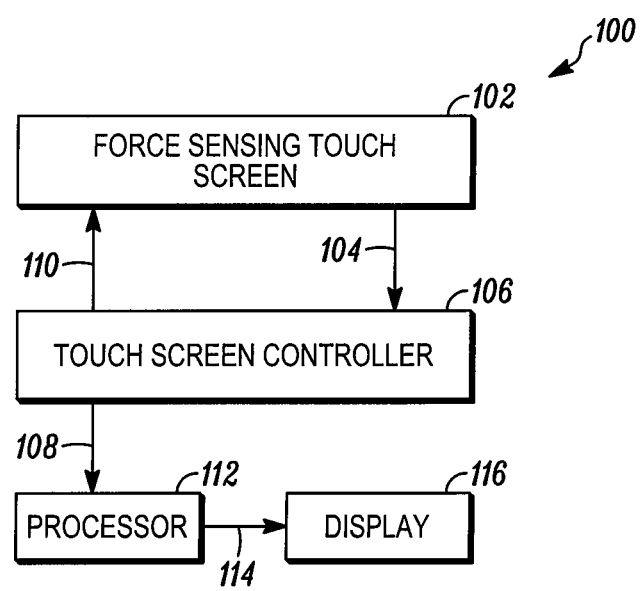
FIG. 8 is a block diagram of a device incorporating the touch screen sensor of the present invention.

While the transparent pressure sensor device described herein can be used in electronic devices in general, a block diagram of a force imaging system 100 as an example using the above-described pressure sensor is depicted in FIG. 8. As shown in FIG. 8, in one embodiment, a touch screen controller 106 provides drive signals 110 to a force sensing touch screen 102, and a sense signal 104 is provided from the force sensing touch screen 102 to the touch screen controller 106, which periodically provides a signal 108 of the distribution of pressure received to a processor 112. The processor 112 interprets the controller signal 108, determines a function in response thereto, and provides a display signal 114 to a display device 116.

Figure 9A:
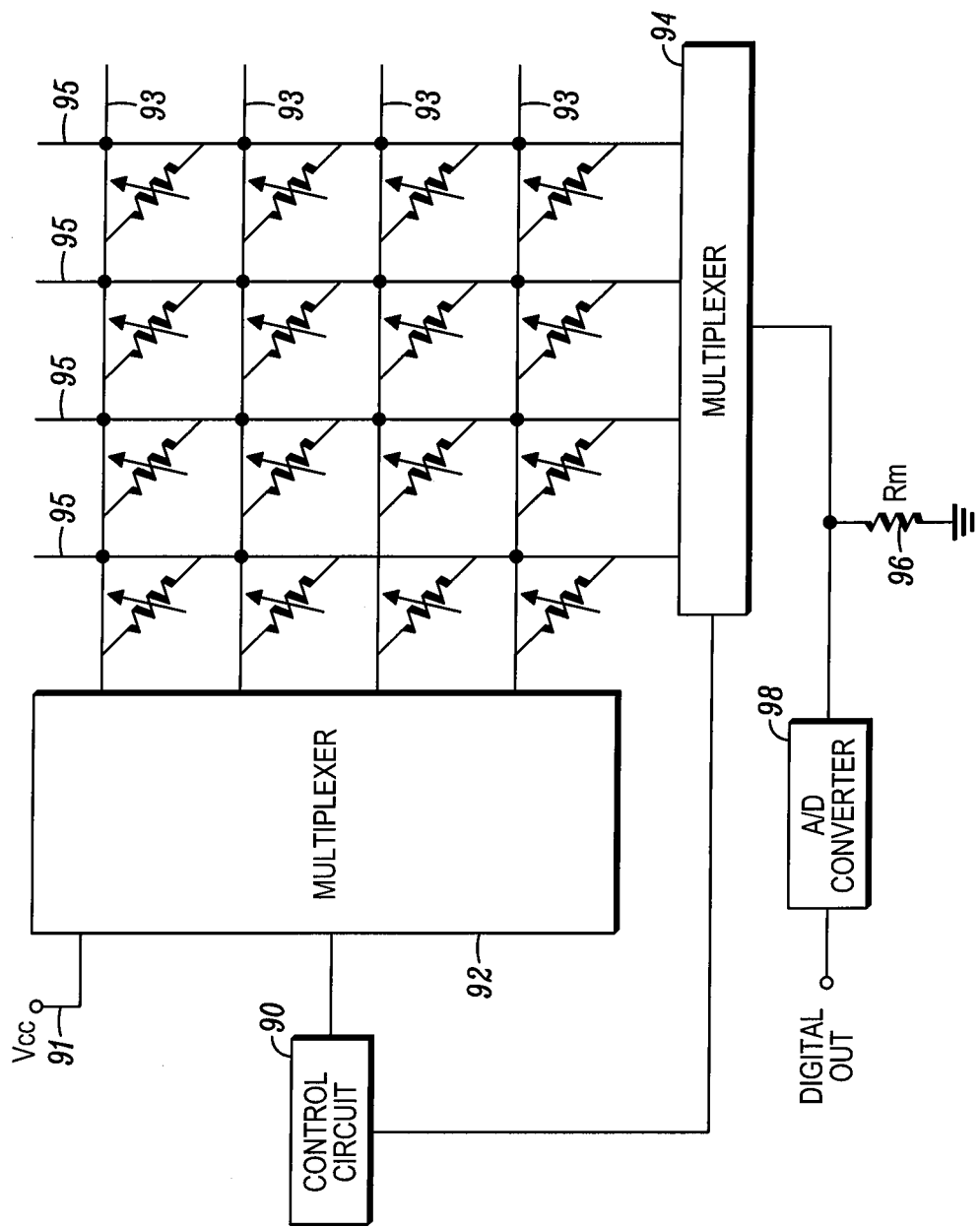
FIGS. 9A-C are schematics of drive schemes for interfacing with the touch screen sensor of FIG. 1.

Various interface electronics for driving the force sensing touch screen 102 are disclosed. For example, referring now to FIG. 9A, in one example embodiment, a drive voltage 91 is applied to each row of TCO electrodes 93 via a control circuit 90 sequentially through a multiplexer 92. Within each row 93, a resistor value of each column of TCO electrodes 95 is read through a sense multiplexer 94. The resistor value is read out using a measurement resistor 96 as a voltage divider. A digital read out is then extracted through an A/D convertor 98 which is connected to the measurement resistor 96.

Figure 9B:
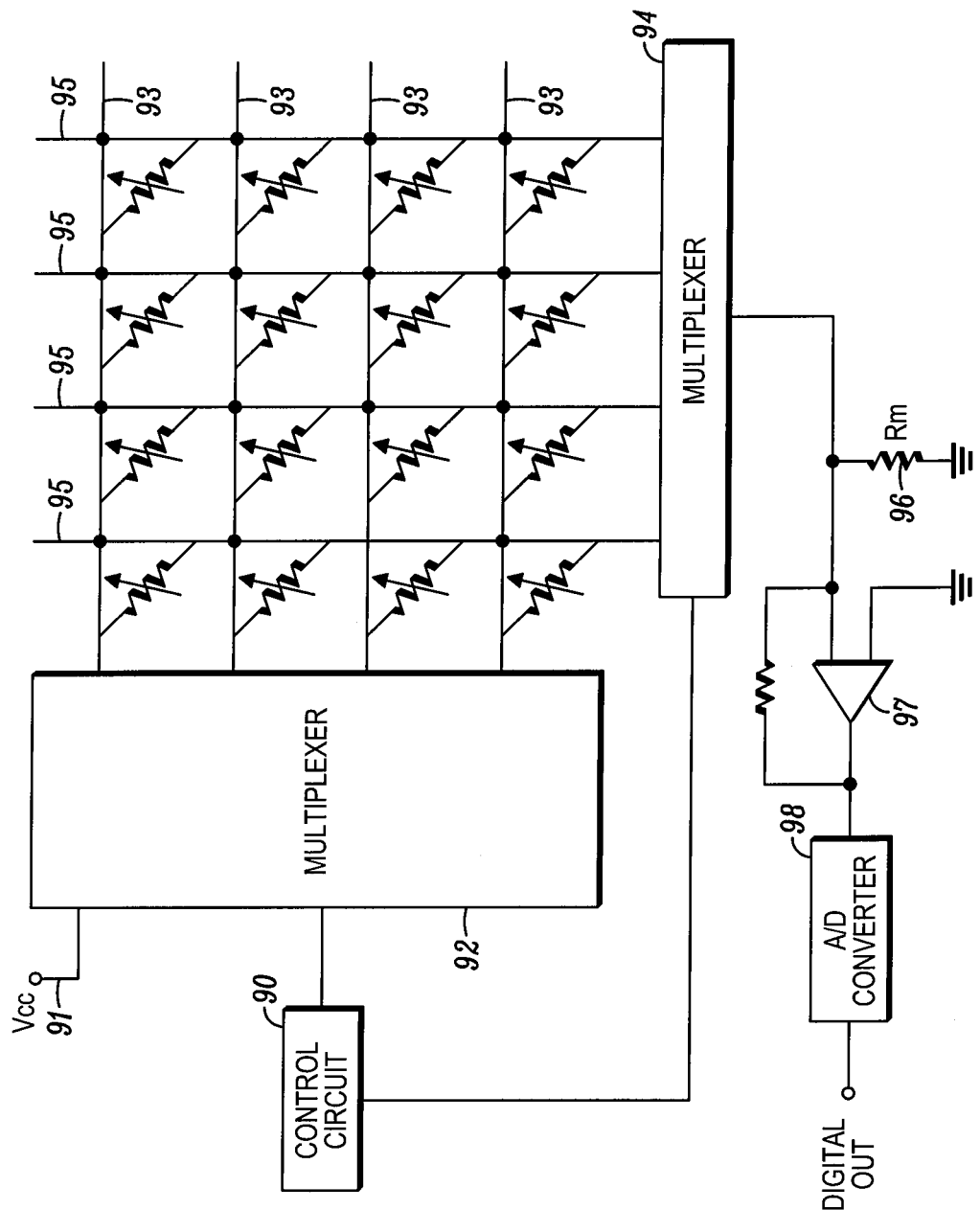
Figure 9C:
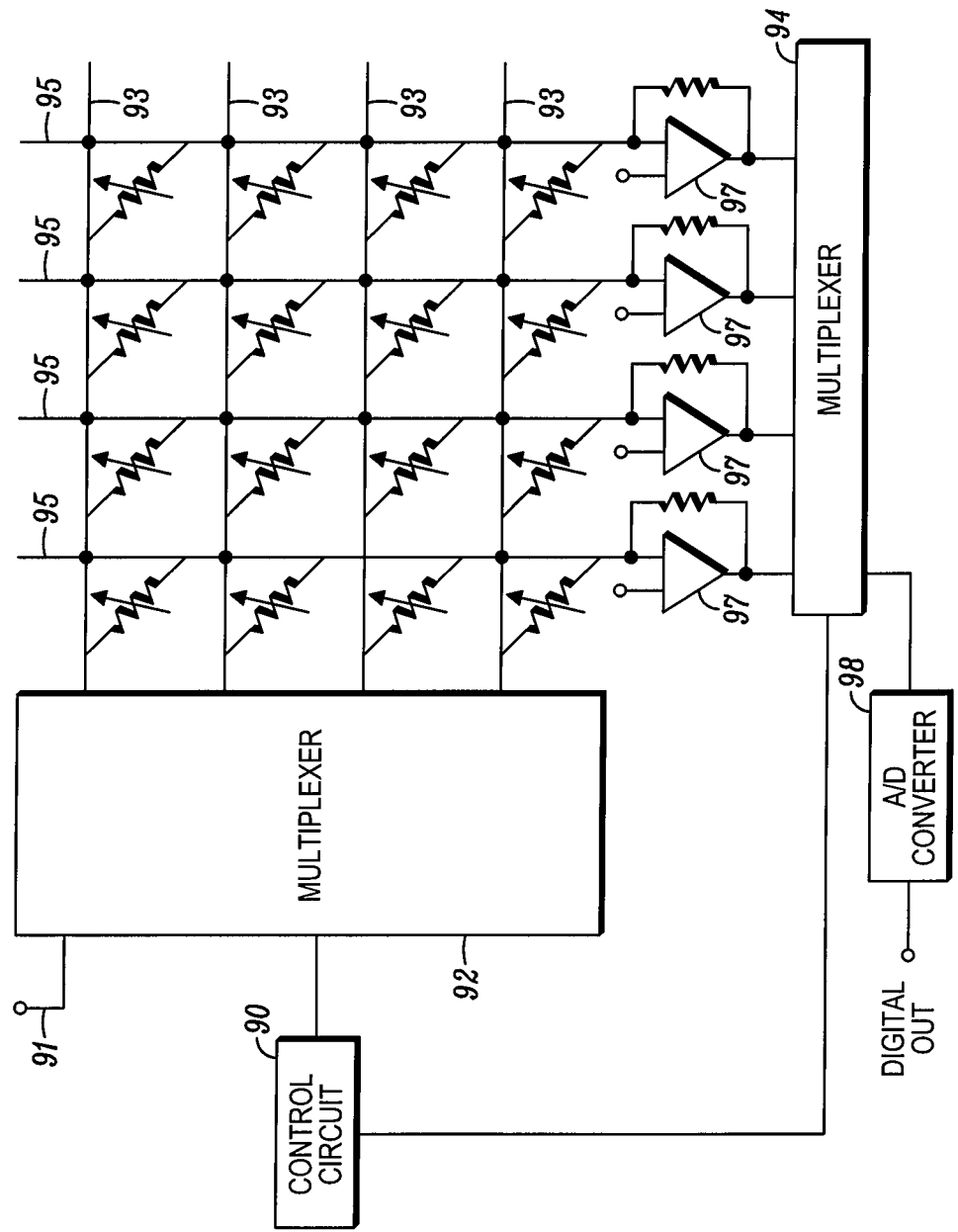

In another exemplary embodiment, referring to FIG. 9B, an operational amplifier 97 is used in addition to the measurement resistor 96 for a more linear interpretation of the voltage-force curve. In yet another exemplary embodiment, as shown in FIG. 9C, an operational amplifier 97 is used for each column of TCO electrodes 95. Advantageously, by implementing an operational amplifier at each column of TCO electrodes 95, cross talk between columns of TCO electrodes 95 can be reduced for a more precise read out and determination of pressure applied.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method of fabricating a force sensing sensor comprising:
    forming a transparent polymer matrix including a plurality of transparent conducting nanoparticles, wherein forming the transparent polymer matrix comprises:
        dispersing the plurality of transparent conducting nanoparticles in a first solvent system,
        dispersing a transparent polymer in a second solvent system,
        combining the first and second solvent systems in a predetermined ratio determined by a percolation value for the combination, and
        degassing the combination;
    disposing on a first surface of the transparent polymer matrix a first plurality of transparent conducting oxide (TCO) electrodes, the first plurality of TCO electrodes arranged in a first direction;
    disposing on a second surface of the transparent polymer matrix opposing the first surface a second plurality of TCO electrodes, the second plurality of TCO electrodes arranged in a second direction overlaying the first direction, and
    providing, by the transparent conducting nanoparticles at the cross section, a conducting path from the at least one of the first plurality of TCO electrodes to the at least one of the second plurality of electrodes, wherein, upon a force being applied at a cross section of at least one of the first and second plurality of TCO electrodes, the force can be measured by probing resistance at the cross section.

2. The method of claim 1, further comprising;
disposing the degassed combination on a substrate to form a dry film.

3. The method of claim 2, further comprising curing the dry film.

4. The method of claim 2, wherein degassing the combination comprises utilizing a vacuum chamber or ambient pressure to remove a gas from the combination.

5. The method of claim 2, wherein disposing the degassed combination on the substrate comprises spin coating, dip coating, or screen printing, or combinations thereof, the degassed combination on the substrate.

6. The method of claim 1, wherein the first solvent system comprises at least one of methyl ethyl ketone (MEK), Toluene, Methonal, 1-Phenoxy-2-Propanol (DPPH), and another solvent with similar solvent qualities.

7. The method of claim 1, wherein combining the first and second solvent systems comprises mixing the combination with a high speed mixer or shaker.

8. The method of claim 1, wherein the transparent conducting nanoparticles comprise indium tin oxide (ITO), zinc oxide (ZnO), tin dioxide (SnO2), or combinations thereof.

9. The method of claim 1, wherein the transparent polymer matrix comprises phenoxy resin, polyethers, acrylic, silicone, lacquer, or other types of transparent elastomers having similar properties, or combinations thereof.

\* \* \* \* \*